United States Patent
Yamasaki et al.

(10) Patent No.: US 12,531,062 B2
(45) Date of Patent: *Jan. 20, 2026

(54) DYNAMIC MICROPHONE SYSTEM FOR AUTONOMOUS VEHICLES

(71) Applicant: Reveal Innovations, LLC, Santa Clara, CA (US)

(72) Inventors: Thomas Yamasaki, Anaheim Hills, CA (US); Rocky Chau-Hsiung Lin, Cupertino, CA (US); Koichiro Kanda, San Jose, CA (US)

(73) Assignee: Reveal Innovations, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,128

(22) Filed: Dec. 26, 2023

(65) Prior Publication Data

US 2024/0127814 A1   Apr. 18, 2024

Related U.S. Application Data

(63) Continuation of application No. 17/109,002, filed on Dec. 1, 2020, now Pat. No. 11,854,541, which is a continuation of application No. 16/389,718, filed on Apr. 19, 2019, now Pat. No. 10,854,202.

(60) Provisional application No. 62/830,788, filed on Apr. 8, 2019.

(51) Int. Cl.
G10L 15/22      (2006.01)
B60R 16/037   (2006.01)

(52) U.S. Cl.
CPC .......... *G10L 15/22* (2013.01); *B60R 16/0373* (2013.01); *G10L 2015/223* (2013.01)

(58) Field of Classification Search
CPC ............... G10L 15/22; G10L 2015/223; G10L 15/10; G10L 21/02; G10L 15/20; G10L 17/00; G10L 2021/02087; G10L 21/0208; B60R 16/0373; B60R 16/037
See application file for complete search history.

(56) References Cited

U.S. PATENT DOCUMENTS

| | | | |
|---|---|---|---|
| 2009/0055180 A1* | 2/2009 | Coon | B60R 16/0373 704/251 |
| 2011/0125500 A1* | 5/2011 | Talwar | G10L 17/26 704/251 |
| 2018/0190282 A1* | 7/2018 | Mohammad | G10K 11/178 |

\* cited by examiner

*Primary Examiner* — Huyen X Vo
(74) *Attorney, Agent, or Firm* — Perkins Coie LLP

(57) ABSTRACT

Devices, systems and processes for a dynamic microphone system that enhances the passenger experience in autonomous vehicles are described. One example method for enhancing a passenger experiences includes generating, using an artificial intelligence algorithm, a plurality of filters based on a plurality of stored waveforms previously recorded by each of one or more passengers and a plurality of recordings of one or more noise sources, capturing voice commands from at least one of the one or more passengers inside the autonomous vehicle, generating voice commands with reduced distortion based on processing the voice commands using the plurality of filters, and instructing, based on the voice commands with reduced distortion, the autonomous vehicle to perform one or more actions.

20 Claims, 12 Drawing Sheets

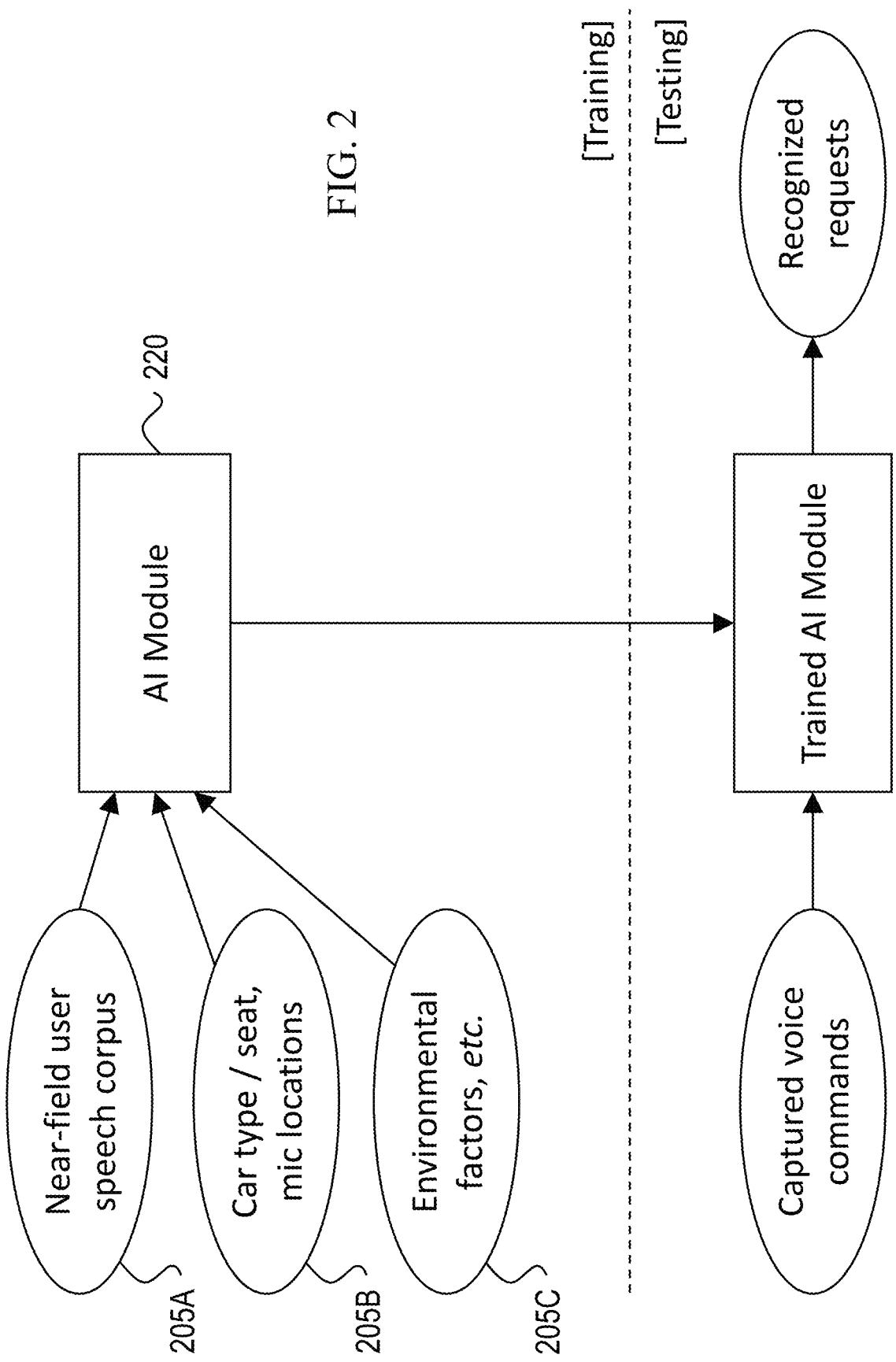

DYNAMIC MICROPHONE SYSTEM FOR AUTONOMOUS VEHICLES

CROSS-REFERENCE TO RELATED APPLICATIONS

This application is a Continuation of U.S. patent application Ser. No. 17/109,002, titled, "DYNAMIC MICROPHONE SYSTEM FOR AUTONOMOUS VEHICLES", filed Dec. 1, 2020, which is a continuation of U.S. patent application Ser. No. 16/389,718, titled, "DYNAMIC MICROPHONE SYSTEM FOR AUTONOMOUS VEHICLES", filed Apr. 19, 2019, now U.S. patent Ser. No. 10/854,202 which claims the benefit of U.S. Provisional Patent Application Ser. No. 62/830,788, filed Apr. 8, 2019, which is incorporated by reference herein in its entirety.

TECHNICAL FIELD

This document relates to systems, devices and processes that enhance the passenger experience in non-, partially- and/or fully-autonomous vehicles.

BACKGROUND

Vehicles are currently equipped with a variety of input and output devices that are leading to completely self-driving cars, but now need to be augmented or reconfigured to provide safe and enjoyable experiences inside the vehicle for the passengers. A dynamic microphone system may be used to provide an enhanced and safe user experience.

SUMMARY

Disclosed are devices, systems and methods for a dynamic microphone system that enhances the passenger experience in autonomous vehicles. This may be achieved by using multiple microphones with artificial intelligence processing that is able to accurately identify passenger voices in various driving scenarios, thereby enhancing the passenger experience. In one aspect, the dynamic microphone system can perform multiple speaker identification, noise cancellation and equalization, and speech recognition to determine passenger requests.

The above and other aspects and features of the disclosed technology are described in greater detail in the drawings, the description and the claims.

BRIEF DESCRIPTION OF THE DRAWINGS

FIG. 2 shows an example flow diagram for training and using an artificial intelligence (AI) module that is part of the dynamic microphone system.

DETAILED DESCRIPTION

Figure 1A:
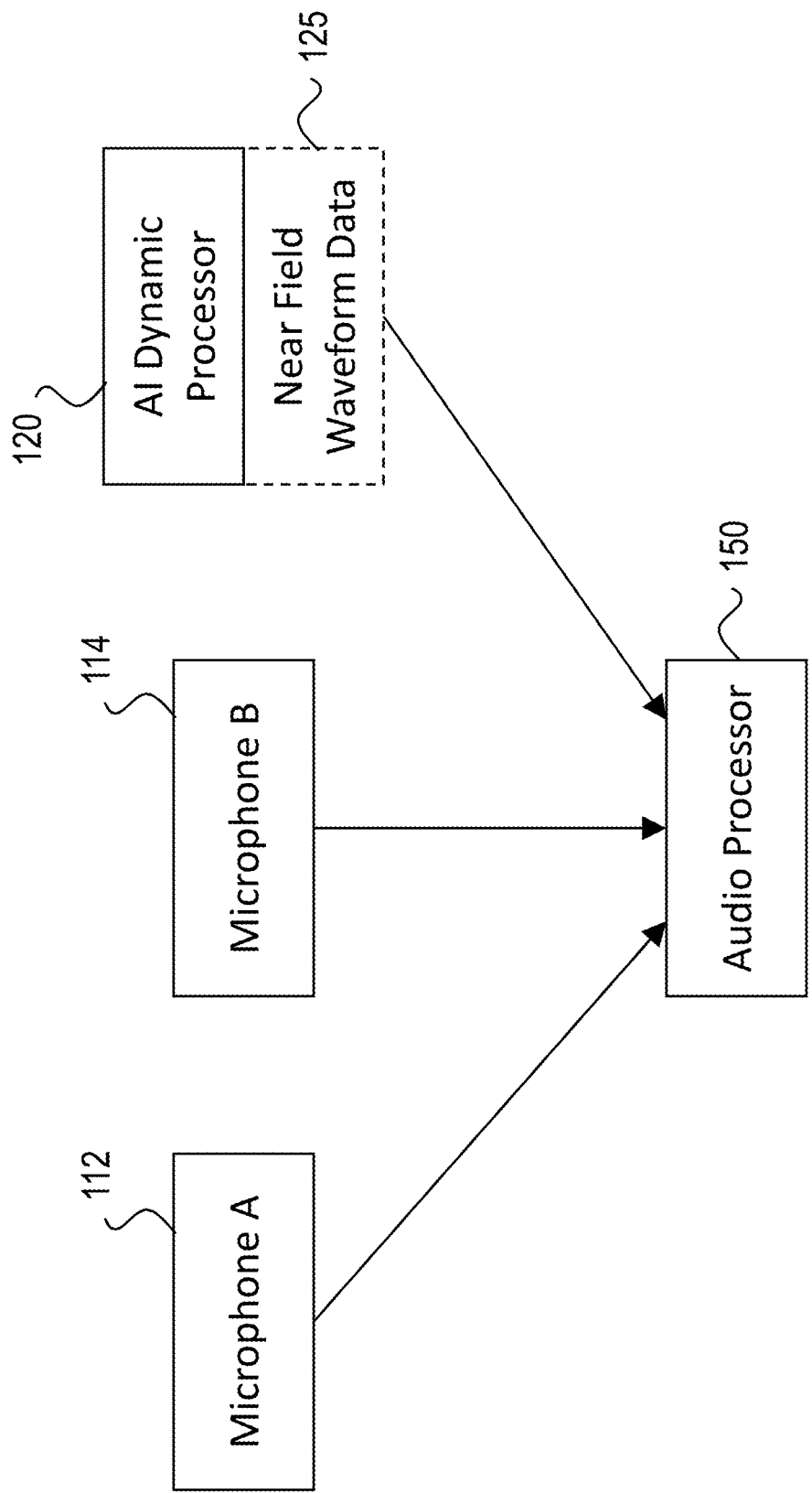
FIGS. 1A and 1B show exemplary arrangements of components of the dynamic microphone system.

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance, staying in the same lane and automatic braking), the safety-protecting warnings of some vehicles (e.g., blind-spot indicators in side-view mirrors and proximity sensors), as well as ease-of-use operations (e.g., autonomous parallel parking and the summon feature).

The move towards autonomous operation of vehicles has also resulted in a change in how users interact with the vehicles themselves. For example, in fully autonomous vehicles, the "driver" may be free to conduct any number of activities not typically possible (e.g., reading a book, watching a movie, looking at a passenger with whom he is engaged in conversation).

Embodiments of the disclosed technology are based on the recognition that the move towards autonomous operation of vehicles also has the ability to change the way in which the passengers interact with the environment around the vehicle. Passengers may be able to dwell longer on things seen in the surrounding landscape (e.g., a picturesque view of the ocean or architectural elements of buildings) or even engage with other drivers and social media applications in slow traffic.

But this opportunity also presents technological and safety challenges.

First, even if the passenger has an interest in more fully engaging with a surrounding environment, present technology does not generally support such interactions. Because traditional automobiles were designed around the premise that the driver is focused on the road and the non-driver passengers are primarily interested in being comfortable inside the cabin, there is relatively little technological infrastructure supporting a passenger's desire to engage with the external environment.

Second, passengers' interest in interacting with the environment outside the vehicle presents a safety concern. Namely, while such interactions may well be beneficial in fully autonomous vehicles, the same interactions (e.g., gazing at length at a picturesque landscape) may be extremely hazardous in vehicles that are not autonomous or only partially autonomous. And it is unlikely that the entire automotive industry will undergo a single, sudden change over from non-autonomous to fully-autonomous vehicles. Thus, a safety problem arises as users themselves alternate between different vehicles with different levels of autonomous operation (e.g., the person's fully autonomous car, the person's spouse's partially autonomous car, a non-autonomous rental car, a friend's non-autonomous car, etc.). Namely, a user that has adopted the social behaviors of greater interaction with external environments that are possible and desirable in an autonomous vehicle may not abandon those same behaviors when driving a non-autonomous vehicle, thereby potentially endangering himself, other passengers in the vehicle, pedestrians, and passengers in other vehicles. It should not be underestimated the way in which minor changes in vehicle environments can cause significant driver confusion. There have been numerous reports of crashes and deaths due to "unintended acceleration" when a driver operated an unfamiliar vehicle, with the ultimate cause being that the driver was unaccustomed to the position of the pedals and inadvertently engaged the accelerator instead of the brake. Thus, minor variations in vehicle environments have the possibility to introduce significant safety risks.

And such variations are likely to increase in the future. Even as autonomous automobiles become commercially viable, it is unlikely that the entire automotive market will make a single, sudden shift to autonomous vehicles. Due to considerations of price, user preference, and other factors, it is likely that the new car market in the coming years will consist of a mixture of different levels of non-, partial-, and fully-autonomous vehicles. Adding to that the existing heterogenous mix of vehicles already on the road, it is likely that drivers in the future will encounter many different types of vehicle operations. And for the reasons described above, this has the potential to introduce significant safety concerns.

Thus, for both technological and safety reasons, the inventors recognize the need for advancements in vehicle technology relating to passenger interaction, especially taking into account that an increasing number of systems have adopted speech as the primary user interface.

Embodiments of the disclosed technology include a dynamic microphone system, which enables the accurate recognition of voice commands by any passenger in any non,—partially—or fully-autonomous vehicle. The dynamic microphone system, which includes multiple generic directional microphones and an artificial intelligence-based audio processor, allows any vehicle to be equipped with accurate voice command recognition.

Figure 1B:
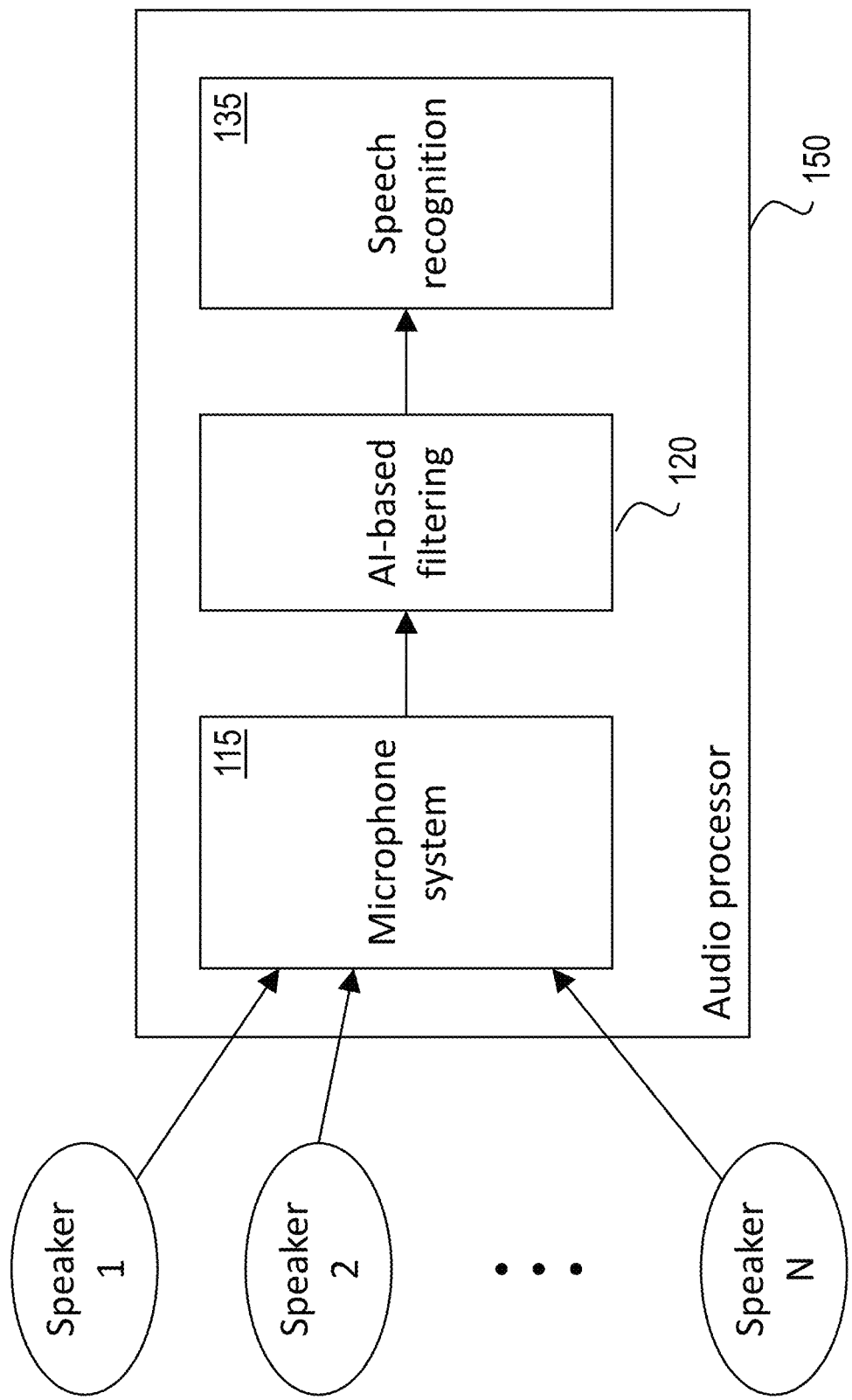

FIGS. 1A and 1B show exemplary arrangements of components of the dynamic microphone system. The embodiment shown in FIG. 1A includes a first microphone 112 (microphone A), a second microphone 114 (microphone B) and an artificial intelligence dynamic processor 120, which includes near-field waveform data 125. These components are combined to produce an audio processor 150 that accurately recognize voice commands from one or more passengers that have been captured using the microphone system. FIG. 1B shows an alternate configuration wherein the audio processor 150 receives input from up to N speakers; the input, which may comprise one or more voice commands, are captured by the microphone system 115, and then processed by AI-based filtering 120 and a speech recognition module 135.

The embodiments shown in FIGS. 1A and 1B include some of the components of the dynamic microphone system; specifically, the microphone system, the AI-based filtering module that is trained using near-field waveform data, and a speech recognition module. In an example, the microphone system capture inputs from the environment and one or more passengers, which may include voice commands. Then, the AI-based filtering module processes the microphone system input to isolate the voice commands (e.g. with reduced distortion) by canceling the environmental (and other) noise as well as other non-relevant conversations. Finally, the isolated voice commands are processed by a speech recognition module to specifically identity the requests of the one or more passengers.

In contrast to existing solutions that using expensive microphone arrays, the disclosed technology advantageously provides a cost-effective solution that includes fixed microphones that have been tuned (or trained) over generic environmental factors using the AI-based modules described in this document.

FIG. 2 shows an example flow diagram for training and using the AI module 220 that is part of the dynamic microphone system. Embodiments of the present technology, and artificial intelligence systems in general, are typically subject to a training phase (or learning process), which allows the trained AI system to recognize a large number of characteristics in the input data more efficiently and more accurately, thereby enabling noise cancellation in the dynamic microphone system. The training phase is followed by the testing (or implementation) phase, wherein the trained AI system is used in the dynamic microphone system.

As shown in FIG. 2A, the inputs to the AI module 220 can include a near-field user speech corpus 205A, different configurations for the implementation of the dynamic microphone system (e.g., varying microphone locations, different types of cars, seat configurations and locations) 205B, and environmental factors 205C. These factors are used by the AI module 220 (as will be further described in the context of FIGS. 3A and 3B) in the training phase to enable operation of the trained AI module in the subsequent testing phase. In the testing phase, captured voice commands are input to the trained AI module, which is able to perform noise cancellation and speech recognition to output recognized requests.

The near-field user speech corpus 205A may be generated in a variety of ways. In some embodiments, a temporary microphone may be used in the vehicle in order to capture speech from a user for generation of the near-field user speech corpus 205A. For example, a Bluetooth headset, Bluetooth headphone, Bluetooth microphone, wired microphone, or a wireless phone with a microphone and an audio capture software application may be used. In such embodiments, the temporary microphone may be configured to capture speech of a user without background noise. For example, a microphone may be placed close to a user's mouth in order to capture the user's speech. As another example, the microphone may be used to capture the user's voice while the vehicle is not moving and thus not causing movement-related background noise. In some embodiments, a microphone outside of the vehicle may be used to capture speech from a user for generation of the near-field user speech corpus 205A. For example, a microphone present in the user's home (e.g., in a smart speaker, in a user's mobile device) may be used to capture the user's speech without the background noise typically present in a moving automobile.

In some embodiments, the speech captures included in near-field user speech corpus 205A may be tagged. The tag associated with a speech capture may indicate a meaning associated with the speech capture. For example, for a particular capture of speech, a tag of "turn left" may be associated therewith, which may indicate that the corresponding speech capture represents the user giving a command to turn the vehicle left. In some embodiments, the system may suggest a tag for a speech capture, and the system may receive feedback from the user on the suggested tag (e.g., accepting suggested tag, rejecting suggested tag, identifying an alternative tag). In some embodiments, the user may enter text in a user interface that defines the tag for the speech capture. In some embodiments, the system may generate tags for the speech captures by comparing the speech captures in near-field user speech corpus 205A with previously captured speech. The previously captured speech may already be associated with tags. The system may identify an appropriate tag for a speech capture in near-field user speech corpus 205A by finding a most-similar speech capture in the set of previously captured speech, and selecting the tag associated with that most-similar previously captured speech.

In some embodiments, a voice profile may be stored for the user based on the near-field user speech corpus 205A. The voice profile may define various parameters that characterize the speech of a user for which the near-field user speech corpus 205A was captured. In some embodiments, the voice profile may be stored on the user's mobile device. In other embodiments, the voice profile may be stored in the cloud or another network-accessible storage location. The system may retrieve the user's voice profile from the storage location. For example, the system may identify the presence of the user in the vehicle (e.g., by the user's mobile device, by voice recognition, etc.), and then retrieve a voice profile corresponding to the user based on this identification. The system may retrieve the voice profile from the user's mobile device, from the cloud, or from any other location where the voice profile is stored.

Figure 3A:
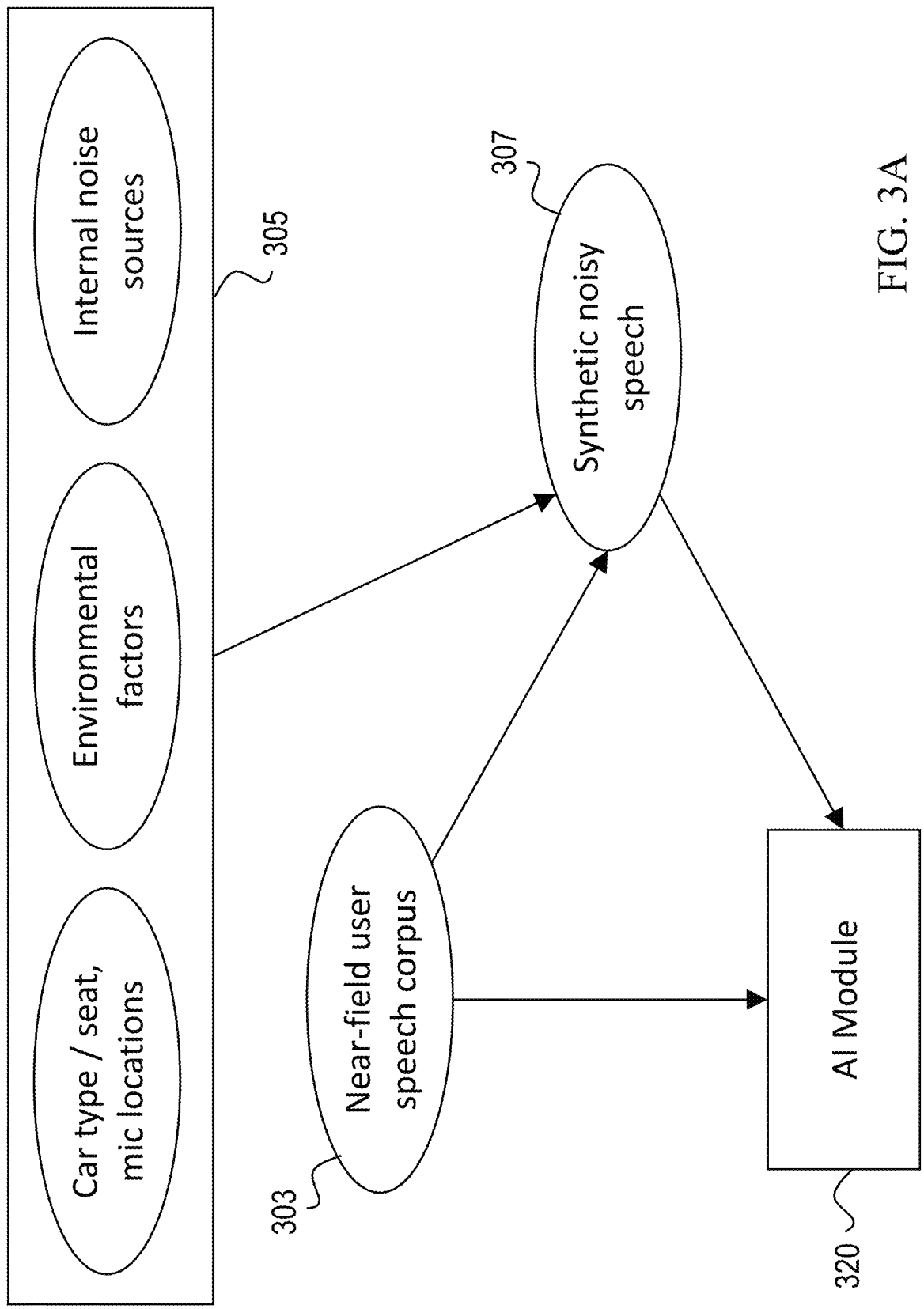
FIGS. 3A and 3B show example flow diagrams for training the AI module.
Figure 3B:
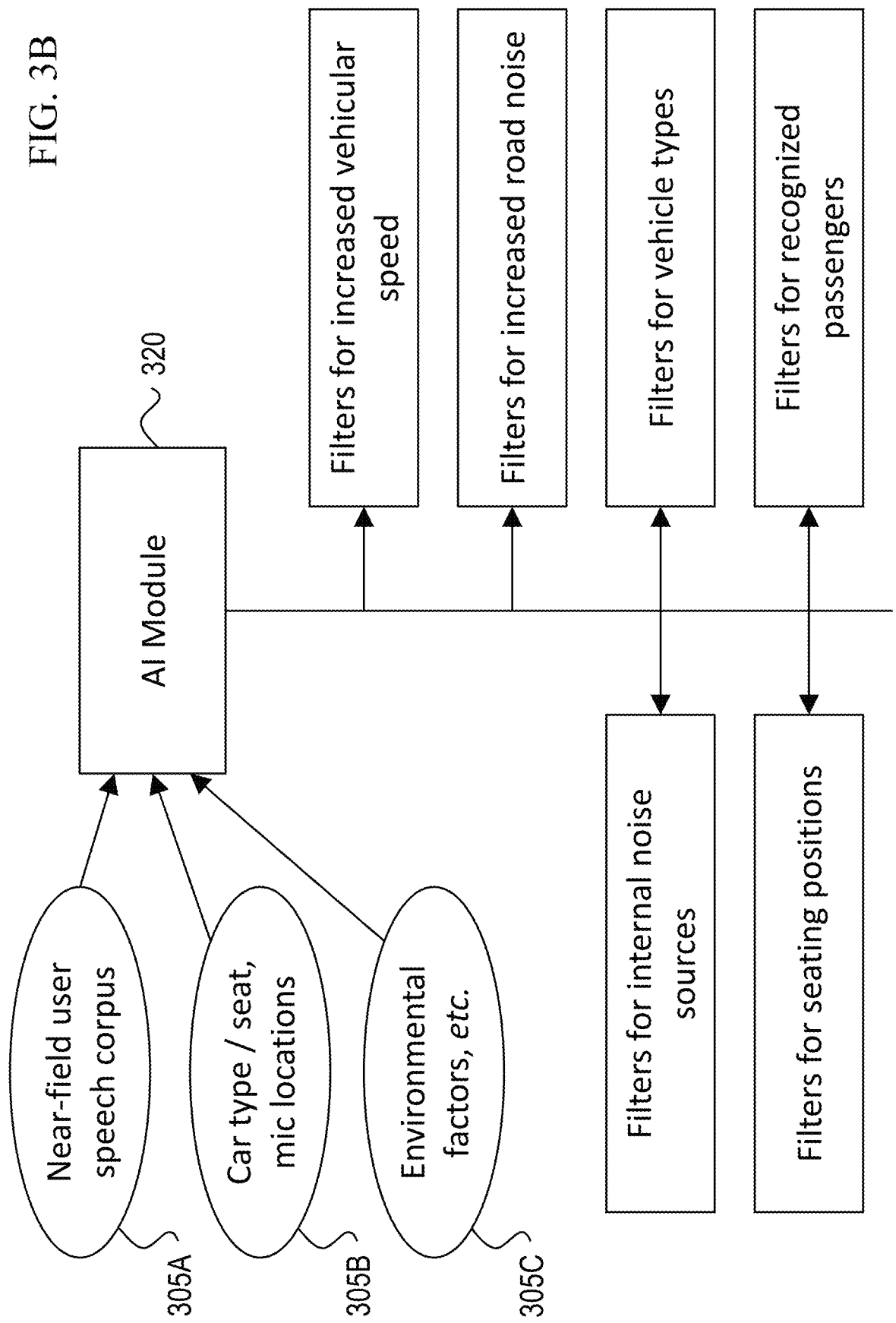

FIGS. 3A and 3B show example flow diagrams for training the AI module. FIG. 3A details the inputs to the training phase shown in FIG. 2, which include the near-field user speech corpus 303 that are voice recordings of multiple candidate passengers with minimal distortion or external acoustic interferences, and waveform recordings of various noise sources 305. In some embodiments, the waveform recordings of the various noise sources include environmental factors (e.g., road noise at different vehicular speeds, rain, wind effects due to open windows, urban traffic, etc.) and internal noise sources (e.g., stereo system playing at different volumes, conversations between persons that are not any of the candidate passengers). Furthermore, the waveform recordings of various noise sources include recordings of the environmental and internal noise sources that are varied across a number of parameters (e.g., microphone locations, seat configurations, car type, etc.).

In order to train the AI module 320 to accurately and efficiently cancel noise in a variety of scenarios, different combinations of the near-field user speech corpus 303 and the waveform recordings of various noise sources 305 are combined to produce a corpus of synthetic noisy speech 307, wherein the various types of noise have been superimposed on the voice recordings of one or more of the multiple candidate passengers. The near-field user speech corpus 303 and the corpus of synthetic noisy speech 307 are used to train the AI module 220.

As shown in FIG. 3B, and as described earlier, the inputs of the AI module 320 include the near-field user speech corpus 305A, different configurations for the implementation of the dynamic microphone system 305B, and environmental factors 305C. Using the exemplary training phase described in FIG. 3A, the AI module 320 generates a plurality of filters that are used to provide accurate noise cancellation during the testing phase. In some embodiments, and as shown in FIG. 3B, these filters can include filters for internal noise sources, filters for seating positions, filters for increased vehicular speed, filters for increased road noise, filters for vehicle types, and filters for recognized passengers. In an example, the filters for increased road noise may be high-pass filters that would suppress (or eliminate) the low-frequency rumbling of the road while keeping the passenger voice relatively untouched. The filters shown in FIG. 3B are merely exemplary, and serve to illustrate the various parameters that can be leveraged by embodiments of the presently disclosed technology.

In another example, the filters may be generated to account for the speed and/or acceleration of the vehicle. Since the noise level in the vehicle typically increases with increasing speed, the AI module 320 can develop an internal model for the noise level as a function of the speed of the vehicle (e.g., recent studies have shown that "rolling noise", which is generated due to the interaction of the tires with the road, has a logarithmic relationship to the speed of the vehicle). Given waveform recordings of various noise sources 305 (e.g., rolling noise recordings at different speeds), the AI module 320 can generate different filters that can be used at different vehicle speeds to reduce the distortion in the voice commands captured by the microphones.

The AI module 320 may be provided in various forms. In some embodiments, the AI module may include a trained AI model. For example, the system may train an AI model to generate frequency domain filters based on environmental conditions. In such an example, the system may take multiple environmental parameters (e.g., cabin window positions, number of passengers, and/or vehicle speed) as input. The AI model may then generate one or more multi-frequency filters that configured to filter out environmental noise in the vehicle. As another example, the system may train an AI model that is used to perform active cancellation of the environmental acoustics in a vehicle. The system may perform the active cancellation in order to capture a "clean" audio input signal (e.g., one without the environmental noise in the vehicle. In either example, the AI system may generate the audio filters or active noise cancellations using the AI module 320, and without human intervention. This may allow the system to generate the best acoustic results for capturing spoken voice in the vehicle. In some embodiments, the system may use a generative adversarial neural network to generate audio filters and/or active noise cancellation parameters.

Figure 4A:
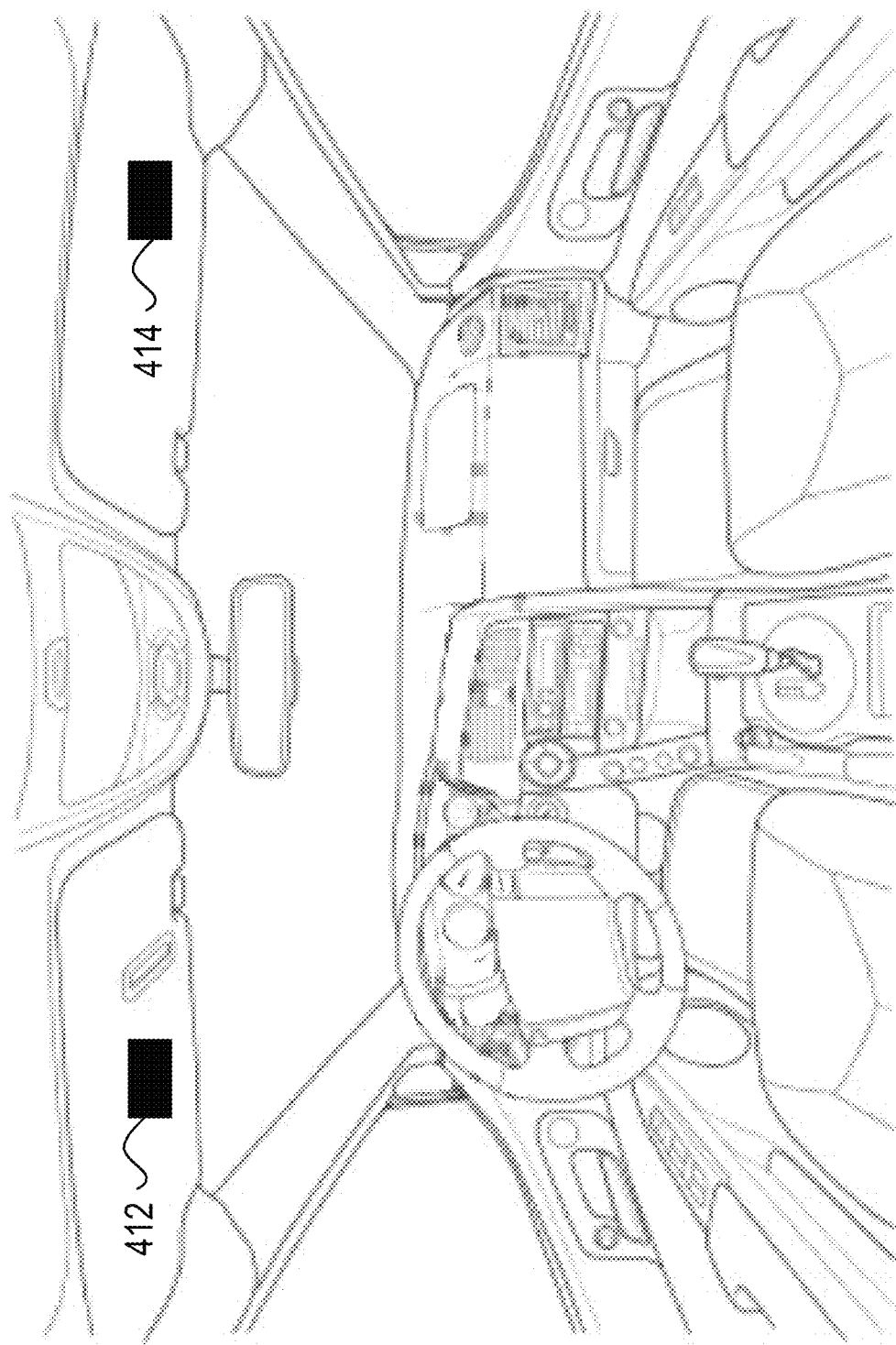
FIGS. 4A and 4B show example configurations for the dynamic microphone system.
Figure 4B:
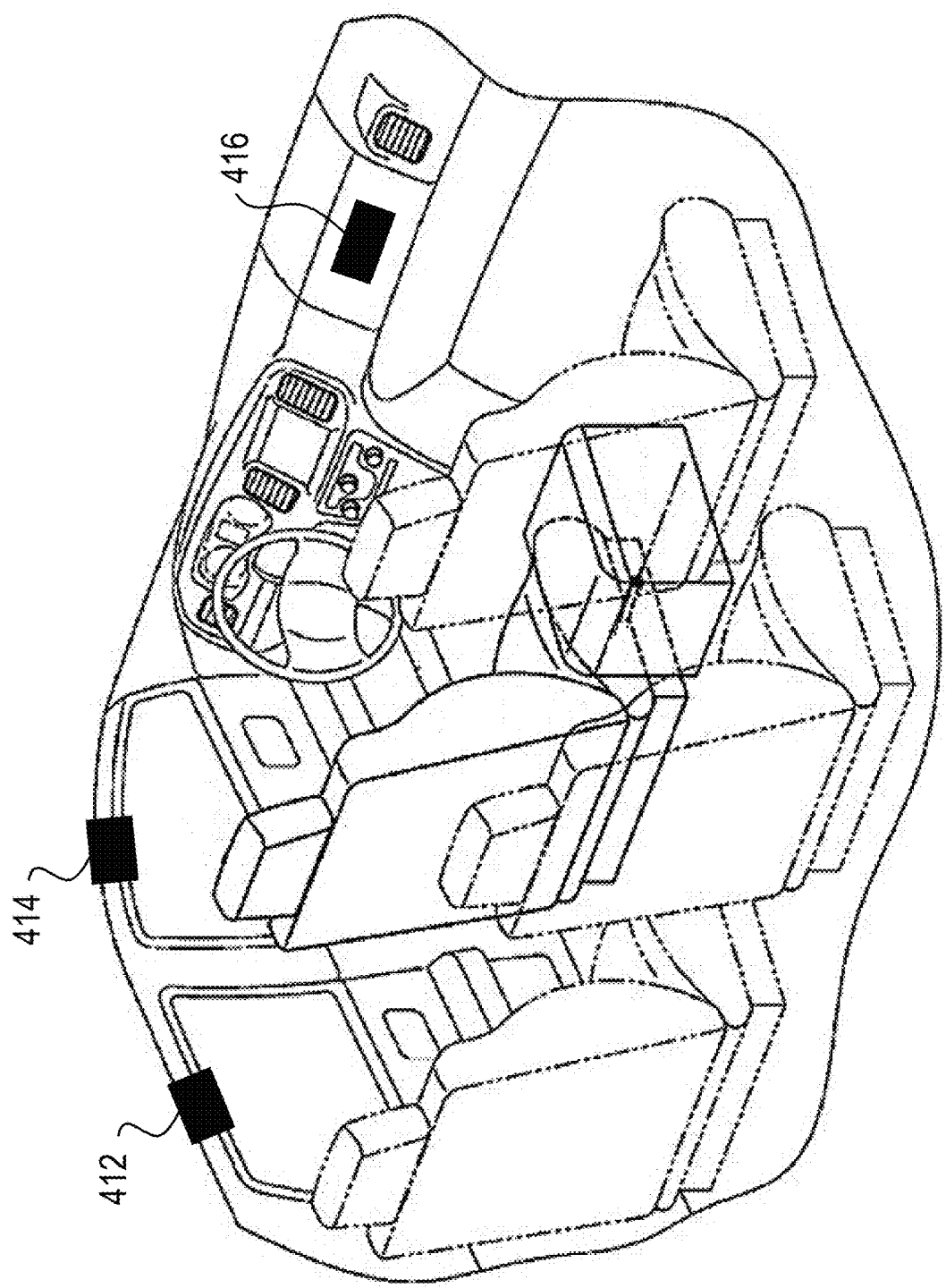

FIGS. 4A and 4B show example configurations for the dynamic microphone system in a vehicle. In the example configuration shown in FIG. 4A, microphones 412 and 414, which may be directional microphones, are placed on the visors and are able to cover the length of the vehicle (e.g., for most sedans and coupes). FIG. 4B shows an alternate configuration wherein a microphone 416 is placed on the dashboard, and microphones 412 and 414 are placed on the sides in order to cover each row of the vehicle (e.g., for SUVs and other vehicles that have more than two rows of seats). The configurations shown and described and merely exemplary, and in some embodiments, microphone configurations may be selected based on the type or size of car, or the available seating configurations.

Figure 5A:
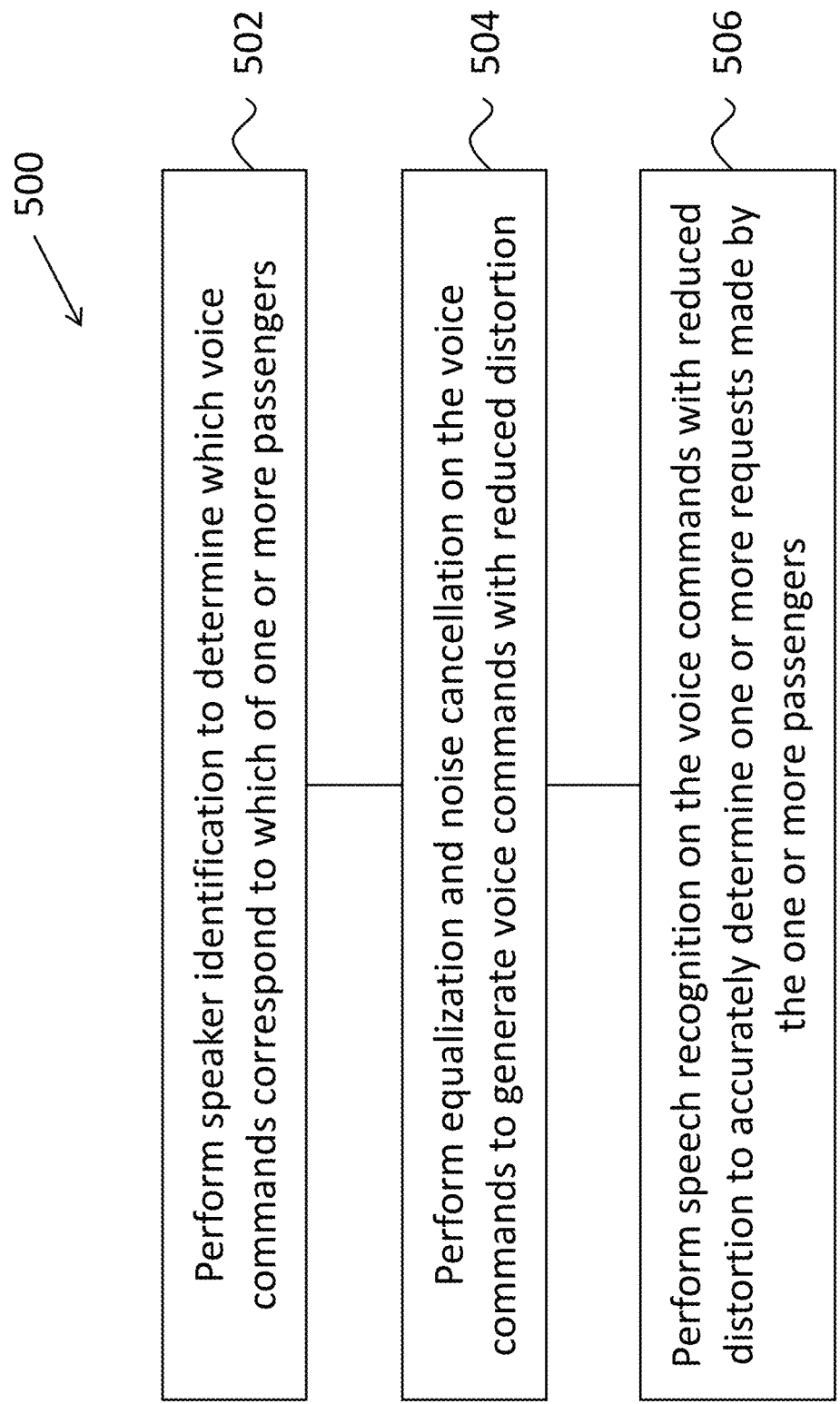
FIGS. 5A-5D show flowcharts of example methods for using enhancing the passenger experience using the dynamic microphone system.
Figure 5B:
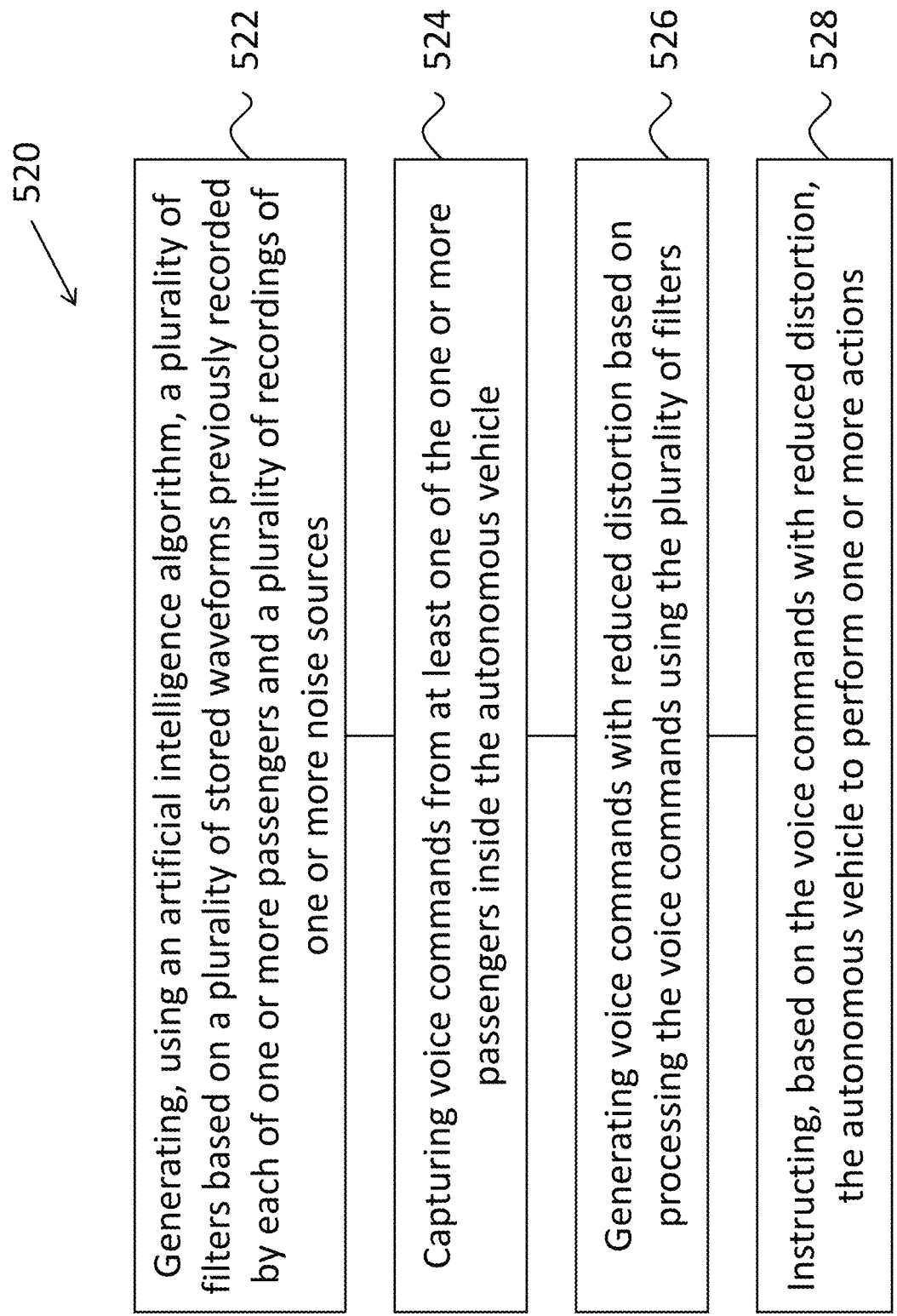
Figure 5C:
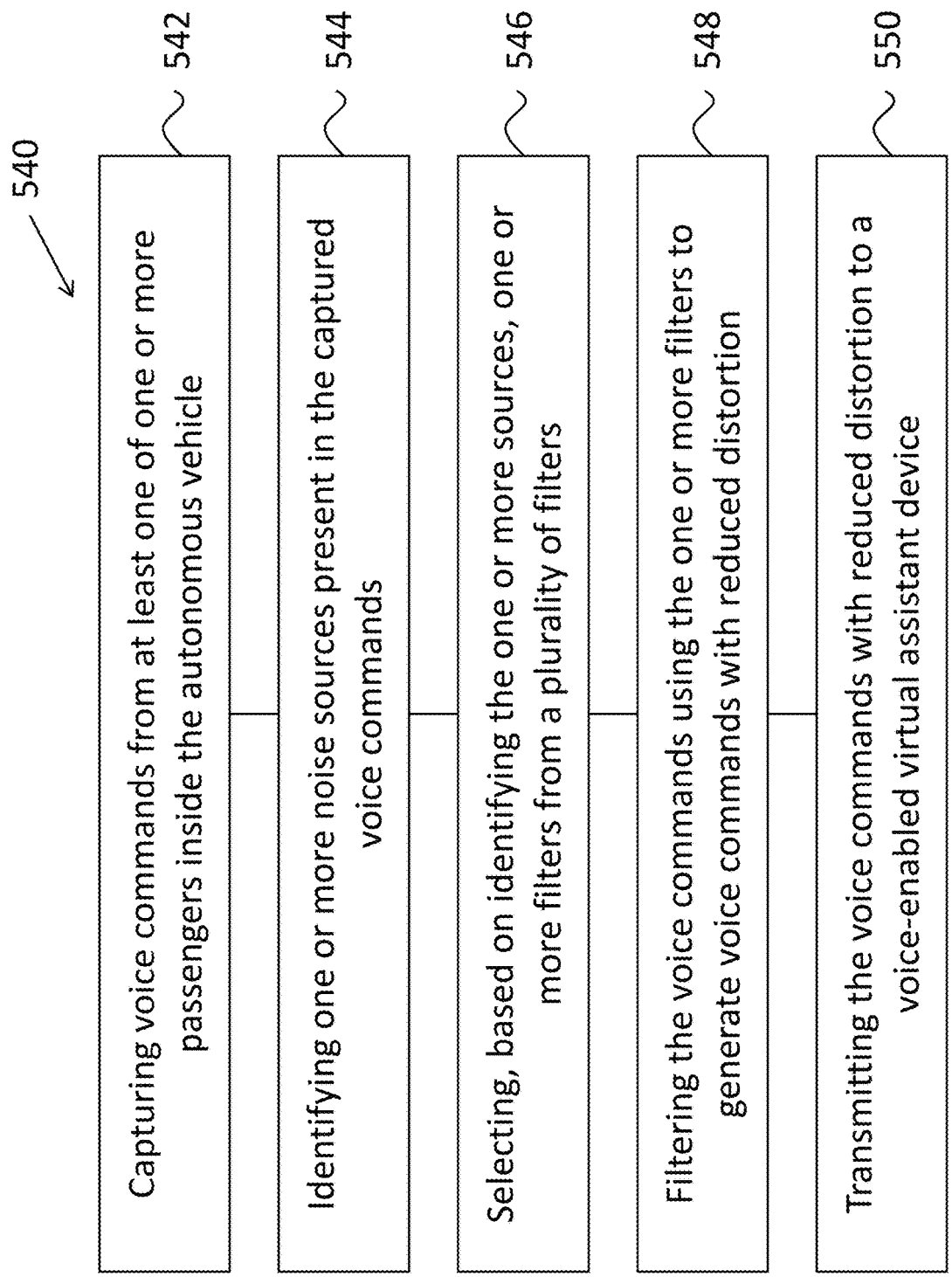

FIGS. 5A-5C show flowcharts of example methods for enhancing the passenger experience using the dynamic microphone system. FIG. 5A shows a flowchart of method 500 for enhancing the passenger experience using the dynamic microphone system. The method 500 includes, at step 502, perform speaker identification to determine which voice commands correspond to which of the one or more passengers. In some embodiments, performing speaker identification includes the steps of comparing the voice commands from the one or more passengers to a plurality of stored waveforms previously recorded by each of the one or more passengers, and determining which voice commands correspond to which of the one or more passengers based on the comparing. In an example, an acoustic phonetic approach may be used for speaker recognition. In another example, a pattern recognition approach may be used.

The method 500 includes, at step 504, perform equalization and noise cancellation on the voice commands to generate voice commands with reduced distortion. In some embodiments, equalization and noise cancellation may be performed using one or more filters that have been generated based on training on a near-field user speech corpus and a corpus of synthetic noisy speech samples. In other embodiments, the filters may be used to reduce the effect of specific types of noise (e.g., road noise, air through the windows), and the resulting voice commands with reduced noise are equalized in a subsequent step.

In yet other embodiments, performing equalization and noise cancellation may include the steps of comparing the voice commands from a first passenger of the one or more passengers to a plurality of stored waveforms previously recorded by the first passenger, deriving expected voice commands for the first passenger corresponding to the voice commands from the first passenger based on the plurality of stored waveforms, identifying acoustic anomalies in the voice commands that represent deviations from the expected voice commands, and removing the acoustic anomalies to generate the voice commands with reduced distortion. In an example, the acoustic anomalies are due to environmental factors, a location of the first passenger in the autonomous vehicle, a volume level or intensity of the voice commands, and/or ambient noise due to other factors.

The method 500 includes, at step 506, perform speech recognition on the voice commands with reduced distortion to accurately determine one or more requests made by the one or more passengers.

In some embodiments, the method 500 may be implemented by a system that includes an audio processor and a plurality of microphones that are coupled to the audio processor.

FIG. 5B shows a flowchart of another method 520 for using enhancing the passenger experience using the dynamic microphone system. This example includes some features and/or steps that are similar to those shown in FIG. 5A, and described above. At least some of these features and/or steps may not be separately described in this section. The method 520 includes, at step 522, generating, using an artificial intelligence algorithm, a plurality of filters based on a plurality of stored waveforms previously recorded by each of one or more passengers and a plurality of recordings of one or more noise sources.

In some embodiments, generating the plurality of filters in method 520 includes the steps of generating a plurality of synthetic waveforms by combining different combinations of the plurality of stored waveforms and the plurality of recordings, performing a training process of the artificial intelligence algorithm based on the plurality of synthetic waveforms and the plurality of stored waveforms, and generating the plurality of filters based on the training process.

The method 520 includes, at step 524, capturing voice commands from at least one of the one or more passengers inside the autonomous vehicle.

The method 520 includes, at step 526, generating voice commands with reduced distortion based on processing the voice commands using the plurality of filters.

The method 520 includes, at step 528, instructing, based on the voice commands with reduced distortion, the autonomous vehicle to perform one or more actions.

FIG. 5C shows a flowchart of yet another method 540 for using enhancing the passenger experience using the dynamic microphone system. This example includes some features and/or steps that are similar to those shown in FIGS. 5A and 5B, and described above. At least some of these features and/or steps may not be separately described in this section. The method 540 includes, at step 542, capturing voice commands from at least one of one or more passengers inside the autonomous vehicle.

The method 540 includes, at step 544, identifying one or more noise sources present in the captured voice commands.

The method 540 includes, at step 546, selecting, based on identifying the one or more sources, one or more filters from a plurality of filters. In some embodiments, the plurality of filters are generated based on an artificial intelligence algorithm that accepts a plurality of stored waveforms previously recorded by each of the one or more passengers and a plurality of recordings of at least the one or more noise sources as input.

The method 540 includes, at step 548, filtering the voice commands using the one or more filters to generate voice commands with reduced distortion.

The method 540 includes, at step 550, transmitting the voice commands with reduced distortion to a voice-enabled virtual assistant device. In an example, the voice-enabled virtual assistant device is an Amazon Echo device, a Siri interface on an iPhone or a Google Assistant on an Android device. For example, embodiments of the disclosed technology could advantageously provide voice commands with significantly reduced distortions to the voice-enabled virtual assistance device.

Figure 5D:
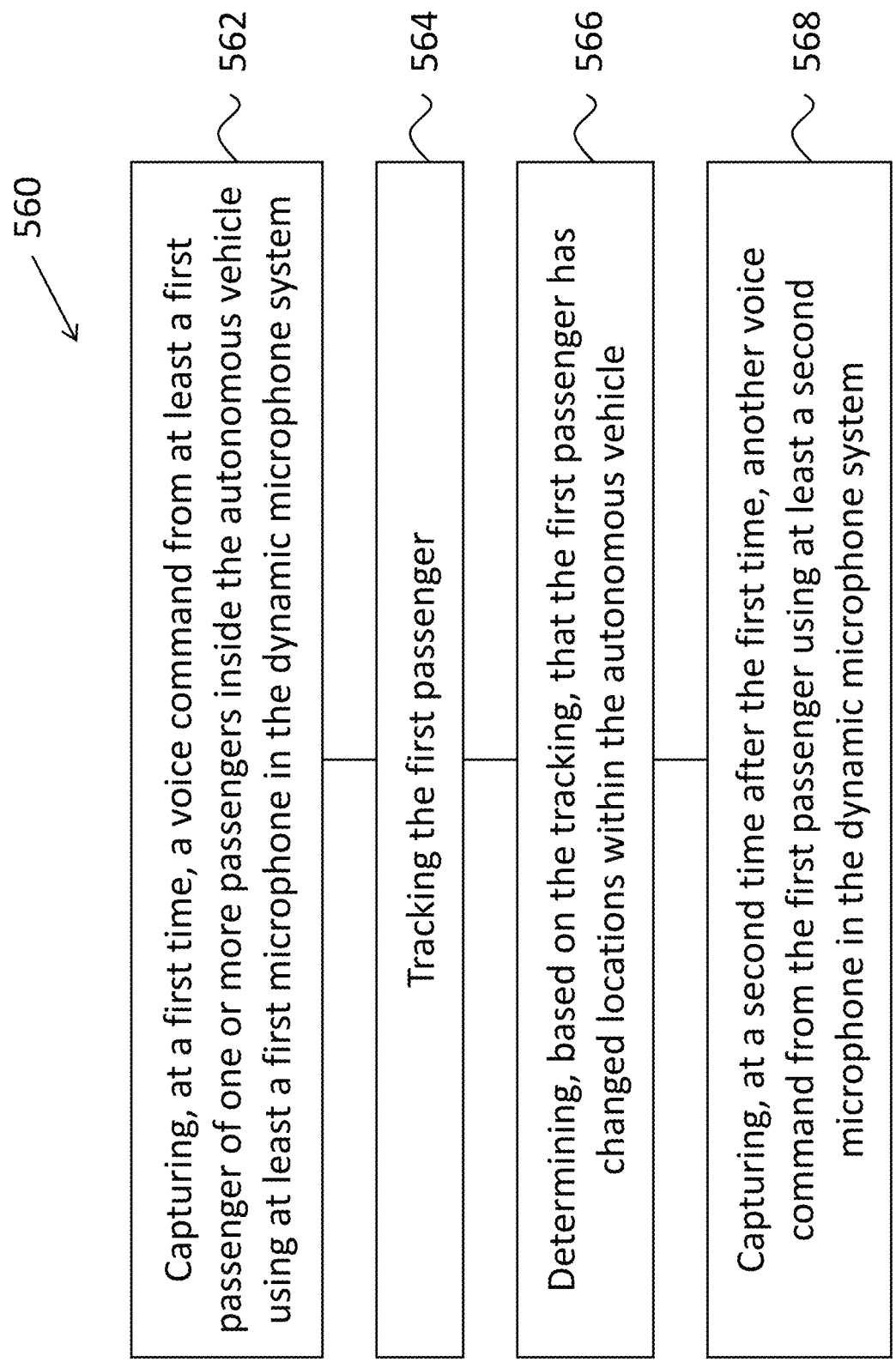

FIG. 5D shows a flowchart of yet another method 560 for using enhancing the passenger experience using the dynamic microphone system. This example includes some features and/or steps that are similar to those shown in FIGS. 5A-5C, and described above. At least some of these features and/or steps may not be separately described in this section. The method 560 includes, at step 562, capturing, at a first time, a voice command from at least a first passenger of one or more passengers inside the autonomous vehicle using at least a first microphone in the dynamic microphone system.

The method 560 includes, at step 564, tracking the first passenger.

The method 560 includes, at step 566, determining, based on the tracking, that the first passenger has changed locations within the autonomous vehicle.

The method 560 includes, at step 568, capturing, at a second time after the first time, another voice command from the first passenger using at least a second microphone in the dynamic microphone system. In some embodiments, the dynamic microphone system comprises a plurality of filters that are generated based on an artificial intelligence algorithm that accepts a plurality of stored waveforms previously recorded by each of the one or more passengers and a plurality of recordings of at least the one or more noise sources as input.

In some embodiments, tracking the first passenger may be based on the dynamic microphone system. For example, using directional microphones and relative volume levels (after the equalization and noise cancellation has been performed), the location of the first passenger may be ascertained within, for example, a van with three rows of seats. In other embodiments, the dynamic microphone system may leverage other sensors or devices to track the first passenger. For example, the passenger's smartphone may be used to determine where he/she is sitting, and then the microphones closest to that passenger may be configured to use the set of filters designed using the near-field speech corpus of that user.

In some embodiments, and in the context of methods 500, 520, 540 and 560, the plurality of microphones forming the dynamic microphone system are arranged in a specific configuration in the autonomous vehicle (see, e.g., FIGS. 4A and 4B), and each of the plurality of microphones is a directional microphone, a microphone array, or an omnidirectional microphone. In other embodiments, the dynamic microphone system may include different types of microphones for different parts of the car. For example, microphones 412 and 414 in FIG. 4B may be directional microphones to capture voice commands in the specific rows, whereas microphone 416 may be an omnidirectional microphone configured to capture a voice command from anyone in the autonomous vehicle.

In some embodiments, the dynamic microphone system may be optimized for specific vehicles (or class of vehicles, e.g., sedan vs SUV) to ensure that the least number of microphones to achieve the noise filtering and voice recognition can be used. In other embodiments, the system may be optimized for a specific region to take in account variations in accents.

Figure 6:
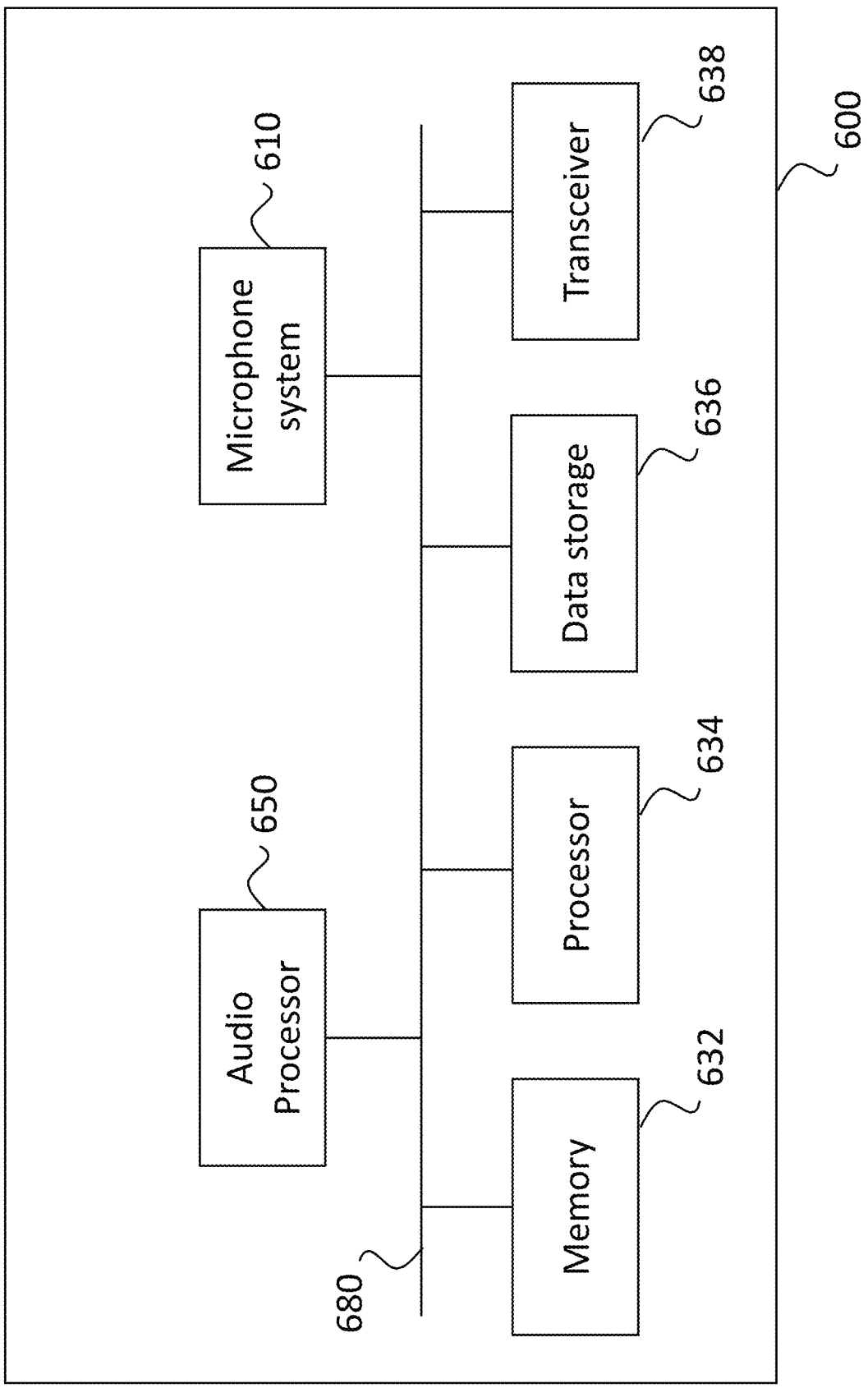
FIG. 6 shows an example of a hardware platform that can implement some techniques described in the present document.

FIG. 6 shows an example of a hardware platform that can implement embodiments of the disclosed technology, and interface with other devices and systems. As shown in FIG. 6, the exemplary dynamic microphone system 600 may include a microphone system 610, an audio processor 650, a memory 632, a processor 634, a data storage 636 and a transceiver 638. One or more of these components may be connected directly, or through the coupling 680 (e.g. a wired communications bus). In some embodiments, the transceiver 638 may be configured to communicate with other devices co-located in the vehicle (e.g. the audio processor and the microphone system, 650 and 610, respectively). In other embodiments, the transceiver may be configured to communicate with external devices, access nodes, and/or vehicles.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A system for use in a vehicle, comprising:
an audio processor; and
one or more microphones coupled to the audio processor, wherein the one or more microphones is configured to capture voice commands from one or more passengers inside of the vehicle,
wherein the audio processor is configured to
process the voice command to generate a reduced distortion voice command, and
wherein the audio processor is configured to process the voice command to generate the reduced distortion voice command by executing an artificial intelligence model using the voice command and an identification of a current configuration of the vehicle as inputs to the artificial intelligence model,
wherein the artificial intelligence model is trained using training inputs that comprise audio training recordings captured inside one or more second vehicles,
wherein the training inputs for the artificial neural network further comprise an indication of a configuration of the one or more second vehicles for a particular audio recording of the audio training recordings.

2. The system of claim 1, further comprising:
a plurality of output devices coupled to the audio processor, wherein the plurality of output devices comprises a navigation system, an entertainment system, a speaker system, and/or a display system.

3. The system of claim 2,
wherein the audio processor is further configured to perform speech recognition on the reduced distortion voice command to determine one or more requests made by the one or more passengers,
wherein at least one of the plurality of output devices is used to execute at least one of the one or more requests made by the one or more passengers.

4. The system of claim 3,
wherein the plurality of output devices executes the at least one of the one or more requests based on an identity of the one or more passengers corresponding to the captured voice commands.

5. The system of claim 1,
wherein the audio processor is configured to perform speaker identification by comparing the voice commands from the one or more passengers to a plurality of stored waveforms previously recorded for the one or more passengers, and
wherein the audio processor is configured to perform the speaker identification by determining which voice commands correspond to which of the one or more passengers based on a result of comparing the voice commands to the stored waveforms.

6. The system of claim 5,
wherein the audio processor is configured to compare the voice commands to the stored waveforms using an acoustic phonetic approach and/or a pattern recognition approach.

7. The system of claim 1,
wherein the audio processor is configured to process the voice commands to generate reduced distortion voice commands by comparing the voice commands to one or more stored waveforms previously recorded for a first passenger of the one or more passengers.

8. The system of claim 7,
wherein the audio processor is configured to process the voice commands to generate reduced distortion voice commands by determining expected voice commands based on a result of comparing the voice commands to the one or more stored waveforms.

9. The system of claim 8,
wherein the audio processor is configured to process the voice commands to generate reduced distortion voice commands by identifying acoustic anomalies in the voice commands that represent deviations from the expected voice commands, and
wherein the acoustic anomalies are due to environmental factors, a location of the first passenger in the autonomous vehicle, a volume level or intensity of the voice commands, and/or ambient noise due to other factors.

10. The system of claim 9,
wherein the audio processor is configured to process the voice commands to generate reduced distortion voice commands by removing the acoustic anomalies from the voice commands to generate the reduced-distortion voice commands.

11. A method for use in a vehicle, comprising:
receiving a voice command captured from one or more passengers inside of the vehicle; and processing the voice command to generate a reduced distortion voice command by executing an artificial intelligence model using the voice command and an identification of a current configuration of the vehicle as inputs to the artificial intelligence model, and
wherein the artificial intelligence model is trained using training inputs that comprise audio training recordings captured inside one or more second vehicles,
wherein the training inputs for the artificial neural network further comprise an indication of a configuration of the one or more second vehicles for a particular audio recording of the audio training recordings.

12. The method of claim 11, further comprising:
performing recognition on the reduced distortion voice command to determine one or more requests made by the one or more passengers; and
executing, by at least one output device, at least one of the one or more requests made by the one or more passengers.

13. The method of claim 12,
wherein the at least one output device includes a navigation system, an entertainment system, a speaker system, and/or a display system.

14. The method of claim 13,
wherein the executing the at least one of the or more requests is performed based on an identity of the one or more passengers corresponding to the captured voice commands.

15. The method of claim 11, further comprising:
performing speaker identification by comparing the voice commands from the one or more passengers to a plurality of stored waveforms previously recorded for the one or more passengers, and
wherein performing speaker identification comprises determining which voice commands correspond to which of the one or more passengers based on a result of comparing the voice commands to the stored waveforms.

16. The method of claim 15,
wherein comparing the voice commands to the stored waveforms comprises using an acoustic phonetic approach and/or a pattern recognition approach.

17. The method of claim 11,
wherein processing the voice commands to generate reduced distortion voice commands comprises comparing the voice commands to one or more stored waveforms previously recorded for a first passenger of the one or more passengers.

18. The method of claim 17,
wherein processing the voice commands to generate reduced distortion voice commands comprises determining expected voice commands based on a result of comparing the voice commands to the one or more stored waveforms.

19. The method of claim 18,
wherein processing the voice commands to generate reduced distortion voice commands comprises identifying acoustic anomalies in the voice commands that represent deviations from the expected voice commands, and
wherein the acoustic anomalies are due to environmental factors, a location of the first passenger in the autonomous vehicle, a volume level or intensity of the voice commands, and/or ambient noise due to other factors.

20. The method of claim 19,
wherein processing the voice commands to generate reduced distortion voice commands comprises removing the acoustic anomalies from the voice commands to generate the reduced-distortion voice commands.

* * * * *